Patented Mar. 13, 1945

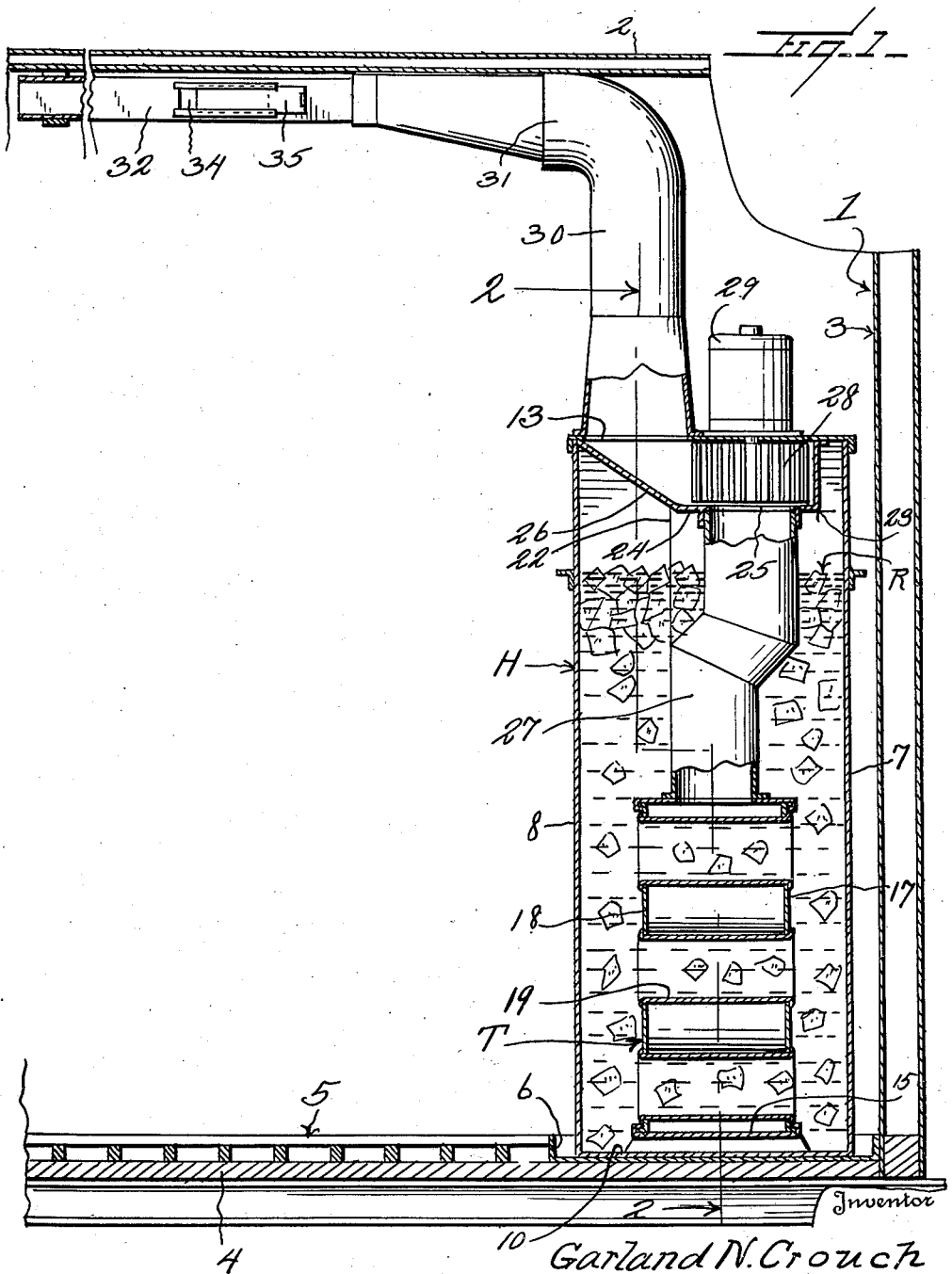

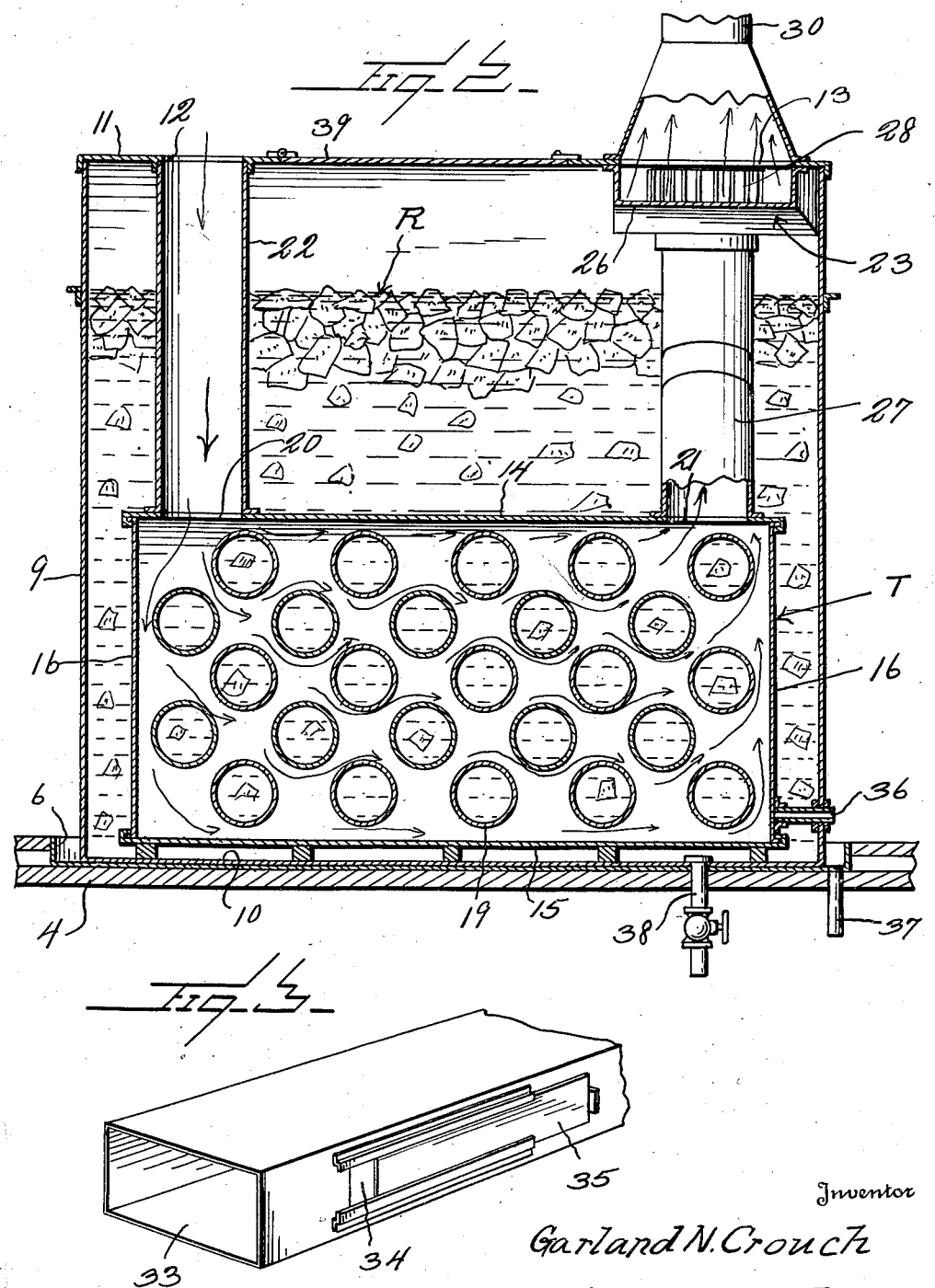

2,371,129

UNITED STATES PATENT OFFICE 2,371,129

AIR REFRIGERATING APPARATUS

Garland N. Crouch, Oklahoma City, Okla.

Application October 4, 1943, Serial No. 504,940

2 Claims. (Cl. 62—131)

This invention relates to the class of refrigeration and pertains particularly to an improved air chilling or refrigerating apparatus for use in situations where it is desirable or necessary to maintain the air at a low temperature.

The primary object of the present invention is to provide an air chilling or refrigerating apparatus which is designed primarily for use in food transporting vehicles and more particularly in interstate trucks which are employed for carrying meats and other perishable food, in which a novel construction makes possible the reduction of air temperatures to a degree which will preserve the perishable foods and maintain such low temperature over a relatively long period of time at a minimum cost.

Another object of the invention is to provide an air refrigerating apparatus which is so constructed that by the use of wet ice and salt or dry ice with a low horsepower air circulating motor capable of running off of the usual vehicle storage battery, the interior air of a truck or similar vehicle may quickly be reduced to a very low temperature and such low temperature maintained without re-charging the apparatus with ice for a relatively long period.

Still another object of the invention is to provide in an apparatus of the character stated, a novel construction of heat transfer unit which causes air circulating therethrough to pass along a tortuous pathway so as to obtain maximum contact with surfaces chilled by the refrigerant medium to effect the maximum transfer of heat from the air to such medium and consequent reduction of the air temperature to the desired degree.

A still further object of the invention is to provide in an air refrigerating apparatus of the character stated, a novel assembly of the parts by which the maximum of efficiency of the apparatus is obtained with a minimum utilization of space within the transportation structure in which the apparatus is disposed.

The invention will be best understood from a consideration of the following detailed description taken in connection with the accompanying drawings, it being understood, however, that the invention is not to be considered as limited by the specific illustration or description but that such illustration and description constitutes a preferred embodiment of the invention.

In the drawings:

Fig. 1 is a view partly in vertical longitudinal section and partly in elevation through the apparatus embodying the present invention and a portion of a vehicle in which the apparatus is set up.

Fig. 2 is a sectional view taken substantially upon the line 2—2 of Fig. 1.

Fig. 3 is a perspective view of a portion of the discharge end of the cold air distribution conduit which is connected with the apparatus.

Referring now more particularly to the drawings, the numeral 1 generally designates a portion of the front end of a vehicle in which the present apparatus is designed to be used, such as a truck. The numeral 2 designates a portion of the top or roof of the truck while a portion of the front wall is indicated at 3 and a portion of the bottom or floor is indicated at 4.

Such structures when designed for transporting meats or other perishable food have a slat false bottom or floor 5, and for the setting up of the present apparatus in such a structure, this false bottom or floor is provided with an open area in the forward part of the structure in which is set a moisture or condensate receiving pan or tray 6 and in this tray the air refrigerating apparatus is located, as shown.

The refrigerating apparatus of the present invention comprises a fluid-tight housing H, here shown as being of rectangular construction although it may be of any other suitable form to adapt to the interior of the truck or other wheeled vehicle in which it is placed. This housing is here shown as having the front and rear side walls 7 and 8, respectively, the side walls 9, bottom wall 10, and top 11. The top wall 11 is provided adjacent one side of the housing with an air inlet opening 12 while adjacent the opposite side of the housing the top wall has formed through the front portion thereof the air outlet opening 13.

Within the housing there is disposed a heat transfer unit which is indicated generally by the character T. This unit is in the form of a casing which conforms in outline generally to the form of the housing in which it is located this casing consequently being of generally rectangular form and having the top, bottom and end walls 14, 15 and 16 respectively, and the front and rear side walls 17 and 18, respectively. The top and bottom walls 14 and 15 are secured to the adjacent edges of the side and end walls in a suitable manner to ensure against the leakage into the casing of fluid from the housing H and the escape of air from the casing into the housing. The casing of the heat transfer unit is shown as having a substantial length which is directed transversely of the vehicle in which the structure or apparatus is mounted and extending through the casing from the front to the rear walls 17 and 18 and through such walls, are open-ended tubes 19 which are of relatively large diameter and are formed like the walls of the casing of a relatively thin metal so as to obtain a ready transfer of heat through the metal from the air to the refrigerant fluid.

The tubes 19 have their axes directed longitudinally of the vehicle structure in which the apparatus is located and it will also be observed upon reference to Fig. 2, that these tubes are arranged in rows extending both horizontally and vertically and that such rows are grouped or located close together so that the tubes of any one row will be positioned or located partly between adjacent tubes of an adjacent row. With this arrangement it will be seen that air will not pass horizontally or vertically through the casing between the tubes along straight paths but must be deflected by the tubes and, therefore, all of the circular surface of each tube will be bathed in the air and a maximum of heat transfer will be obtained from the air within the casing to the refrigerant fluid lying within and flowing through the tubes in the manner hereinafter stated.

The top wall 14 of the heat transfer unit casing has formed therethrough the air inlet and air outlet openings indicated respectively by the numerals 20 and 21. Secured to the top wall 14 over and in register with the air inlet opening 20 is an air inflow pipe 22 which has its other end secured to the top wall 11 of the housing in the inlet opening 12.

Secured to the underside of the top wall 11 of the housing adjacent the air outlet opening 13 is a box 23 which has a bottom wall 24 provided with an opening 25 which is offset from the opening 13. This bottom wall 24 is angled upwardly through the portion underlying the air outlet opening 13 to form the deflector wall 26. As shown in Fig. 1, the box 23 to which the cold air flows from the unit T, overlies the outlet opening 13 and discharges therethrough.

The numeral 27 designates the air outflow pipe from the heat transfer unit and the lower end of this pipe is connected over the opening 21 in the top wall 14 of the unit T, while the upper end of this pipe is connected in the opening 25 of the refrigerated air receiving box 23.

The box 23 constitutes a housing for a fan scroll 28 and there is mounted upon the top wall 11 of the housing H an operating electric motor 29 for this fan, the shaft of which motor is connected with the fan, as shown, and the fan is rotated so as to draw air upwardly through the pipe 27 from the heat transfer unit and force it out through the opening 13.

As shown in Fig. 1 and Fig. 2, the heat transfer unit is of a size to have a substantial space around it between its side and end walls and the adjacent walls of the housing so that a free circulation of refrigerant medium, which may be either salted wet ice or dry ice, can be had and as shown, the heat transfer unit is submerged in such medium. The refrigerant here illustrated is indicated by the character R and in addition to completely submerging the unit T, it extends a substantial distance up in the housing around the pipes 22 and 27.

Connected with the top wall 11 of the housing over the air outlet opening 13 is a pipe 30 which extends upwardly and terminates in the elbow and reduction coupling 31 which is directed rearwardly in the vehicle and is connected with a distributing conduit 32. This conduit 32 is preferably of rectangular cross-section as shown, and extends from the front end of the vehicle to a point adjacent the rear end thereof and is open at its rear end as shown at 35 in Figure 3.

At intervals along the length of the conduit 32 lateral outlet openings 34 are formed which are covered by the sliding gates 35. These gates are employed to regulate the circulation of the refrigerated air through the vehicle.

In order to facilitate the removal of condensate from within the heat transfer unit casing, an end wall 16 thereof is provided with a drain tube 36 as shown in Fig. 2. This tube passes through the space between the wall 16 and the adjacent wall of the housing and discharges into the pan 6. This pan has a drain pipe 37 which passes downwardly through the floor 4 of the vehicle, so that the drainage from the pan passes out to the ground. There is also provided, as shown in Fig. 2, a valved drain pipe 38 for the housing from which the refrigerant liquid can be drawn off as desired.

The top wall 11 of the housing H has a hinged door 39 by which access is had to the interior of the housing for the stocking or charging of the same with the necessary refrigerant medium.

It will be readily understood that the refrigerating apparatus of the present application may be provided in different sizes as required both for the size of the vehicle in which it is to be used and for obtaining an air temperature of a desired degree. These units are constructed so that the housing is capable of carrying anywhere from 800 to 1000 pounds of wet ice and the unit is capable of moving 250 feet of air per minute and when the brine refrigerant within the housing has a temperature of zero, of reducing the air temperature from 80° F. to 20° F. and maintaining the air at this low temperature for not less than 36 hours. Proper circulation of air can be maintained through the apparatus by the single fan operated by a motor capable of being run by an ordinary storage battery such as is commonly used upon trucks.

As will be readily apparent from the foregoing description of the invention, when the apparatus is set up for use and the motor 29 has been set in motion, the fan 28 will draw air in through the pipe 22 into the heat transfer unit where it will flow through the casing of this unit and around the several tubes 19 to give up its heat to the refrigerant medium with which the housing is filled. This medium, of course, not only surrounds the casing of the heat transfer unit but also fills the tubes of such unit. While ordinary convection currents will be set up in the refrigerant medium as the same absorbs heat from the air so that colder portions of the medium will take the place of that which has become warmed and tends to rise, the movement of the vehicle, particularly when starting and stopping or when accelerating or decelerating its speed will cause the refrigerant medium to be sloshed back and forth through the tubes so that the medium will be constantly changing its position around the heat transfer unit and in the tubes thereof and thus the maximum of operating efficiency will be obtained.

What is claimed is:

1. An air refrigerating apparatus, comprising a fluid-tight housing having a top wall provided with an air inlet opening and an outlet, a heat transfer unit within the housing including a closed casing, said casing having a top wall provided with remotely spaced air inlet and air outlet openings, a pipe connecting the casing air inlet opening with said housing inlet opening, an air conduit connecting the casing outlet opening with the housing outlet opening, an air circulator within said conduit for drawing air through the casing and discharging it through the housing outlet, a relatively long air distributing conduit connected at one end with said housing outlet for the discharge of refrigerated air at a remote point from the housing and provided with a plurality of side wall air outlet openings, and a shiftable gate movable relative to each of said openings for controlling the escape of air therethrough.

2. A heat transfer unit for a refrigerating apparatus of the character described, comprising a casing designed to be submerged in a refrigerating medium, said casing having top, bottom, side and end walls, a plurality of open end tubes extending horizontally through the casing between and through said side walls, said tubes being arranged in rows which are spaced to position the tubes of one row partly between the tubes of an adjacent row whereby to partly obstruct the flow of air through the casing and to cause the air to flow around the tubes rather than along a straight path from one end of the casing to the opposite end, an air inlet means leading into the casing adjacent one end, and an air outlet means leading from within the casing adjacent the other end.

GARLAND N. CROUCH.